United States Patent
Scavino

(10) Patent No.: US 9,095,158 B2
(45) Date of Patent: Aug. 4, 2015

(54) PACKAGED FOOD PRODUCT AND A PROCESS FOR ITS PRODUCTION

(75) Inventor: Mario Scavino, Grinzane Cavour (IT)

(73) Assignee: SOREMARTEC S.A., Findel (LU)

( * ) Notice: Subject to any disclaimer, the term of this patent is extended or adjusted under 35 U.S.C. 154(b) by 100 days.

(21) Appl. No.: 13/511,456

(22) PCT Filed: Nov. 26, 2010

(86) PCT No.: PCT/IB2010/055447
§ 371 (c)(1),
(2), (4) Date: May 23, 2012

(87) PCT Pub. No.: WO2011/064747
PCT Pub. Date: Jun. 3, 2011

(65) Prior Publication Data
US 2012/0282375 A1    Nov. 8, 2012

(30) Foreign Application Priority Data
Nov. 27, 2009   (IT) .............................. TO2009A0931

(51) Int. Cl.
*A23G 3/54*    (2006.01)
*A23G 1/54*    (2006.01)
*A23L 1/164*   (2006.01)
*A23L 1/18*    (2006.01)

(52) U.S. Cl.
CPC .. *A23G 1/54* (2013.01); *A23G 3/54* (2013.01); *A23L 1/164* (2013.01); *A23L 1/18* (2013.01)

(58) Field of Classification Search
CPC .............. A23G 1/54; A23G 3/54; A23L 1/18; A23L 1/164
See application file for complete search history.

(56) References Cited

U.S. PATENT DOCUMENTS

| | | | |
|---|---|---|---|
| 3,184,316 | A | 5/1965 | Doan et al. |
| 4,342,787 | A | 8/1982 | Rebaudieres et al. |
| 2002/0017197 | A1 | 2/2002 | Capodieci |
| 2002/0168448 | A1 | 11/2002 | Mody |
| 2003/0003207 | A1 | 1/2003 | Capodieci |
| 2006/0233920 | A1 | 10/2006 | Johnson |

FOREIGN PATENT DOCUMENTS

| | | |
|---|---|---|
| DE | 10357828 A1 | 7/2004 |
| EP | 0348196 A1 | 12/1989 |
| EP | 1300083 A1 | 4/2003 |
| WO | 9956561 A1 | 11/1999 |

OTHER PUBLICATIONS

Evaporated Milk is Dehydrated Milk, BLOG, [on line] 2002, no month given, retrieved Jan. 16, 2014. Retrieved from the Internet: URL:< http://www.candicekumai.com/blog/dine-tease-ditch/>.*

* cited by examiner

*Primary Examiner* — Rena L Dye
*Assistant Examiner* — Chaim Smith
(74) *Attorney, Agent, or Firm* — Rothwell, Figg, Ernst & Manbeck, P.C.

(57) ABSTRACT

A packaged food product comprising a tray (2) containing an edible composition having a layered structure, comprising: —at least one composite layer (24) comprising puffed cereal grains (G) embedded in a matrix of edible material (22); and —at least one edible coating layer (26) deposited on said composite layer (24) and preferably including chocolate. The matrix of edible material (22) has, in a temperature range of between 20° C. and 40° C., and preferably also in the range of from 0° C. to 40° C., a pasty consistency such as to maintain its own shape in unconfined conditions.

17 Claims, 4 Drawing Sheets

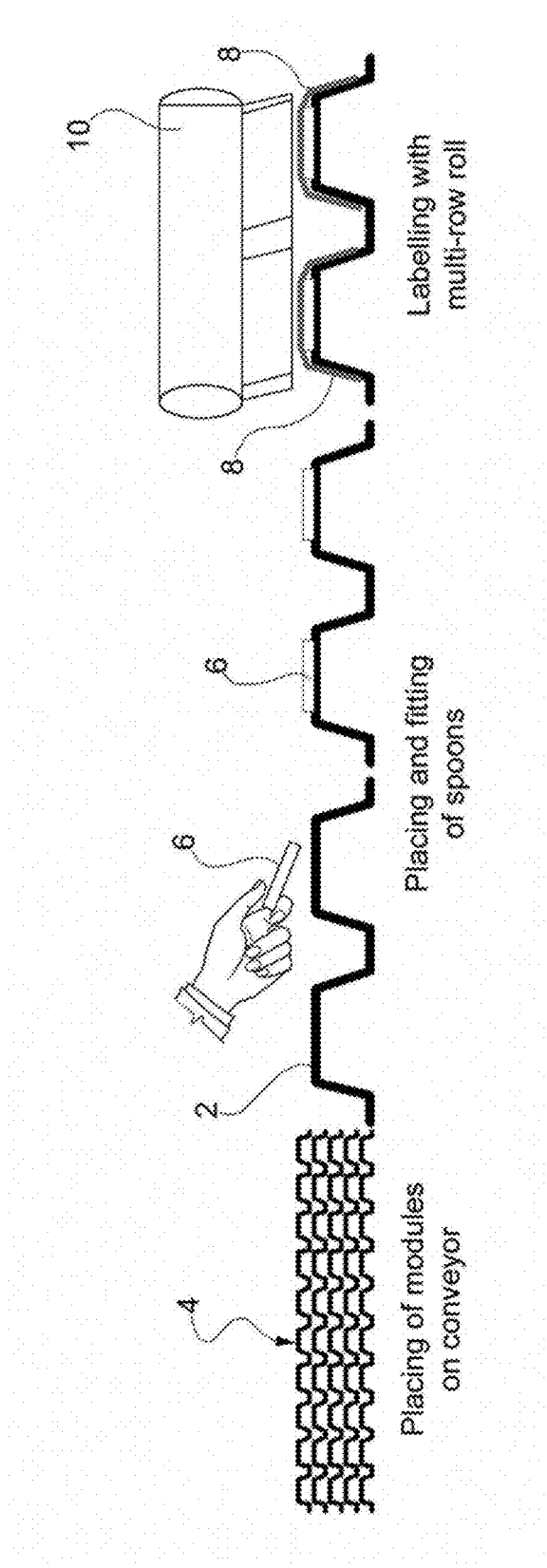

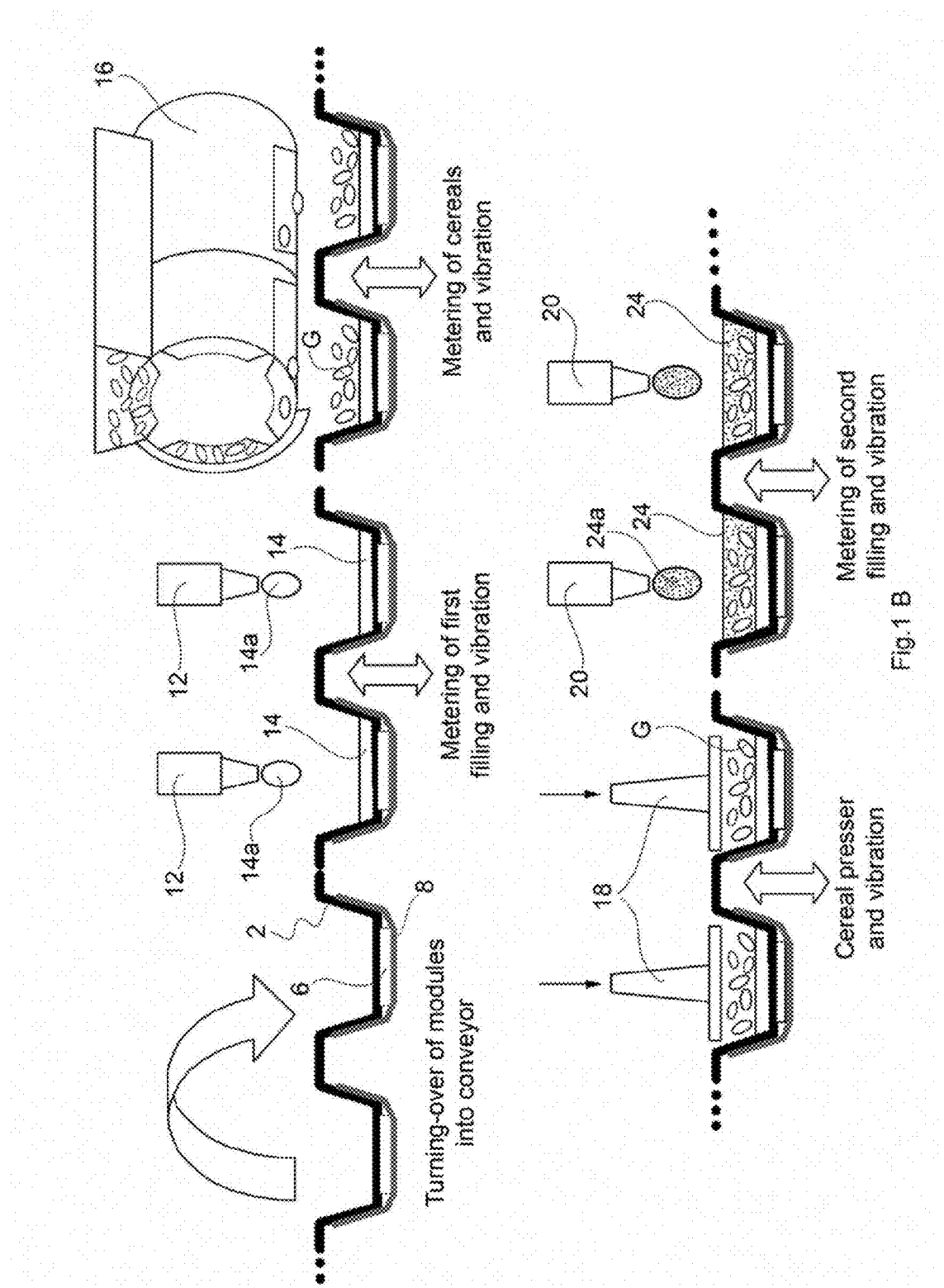

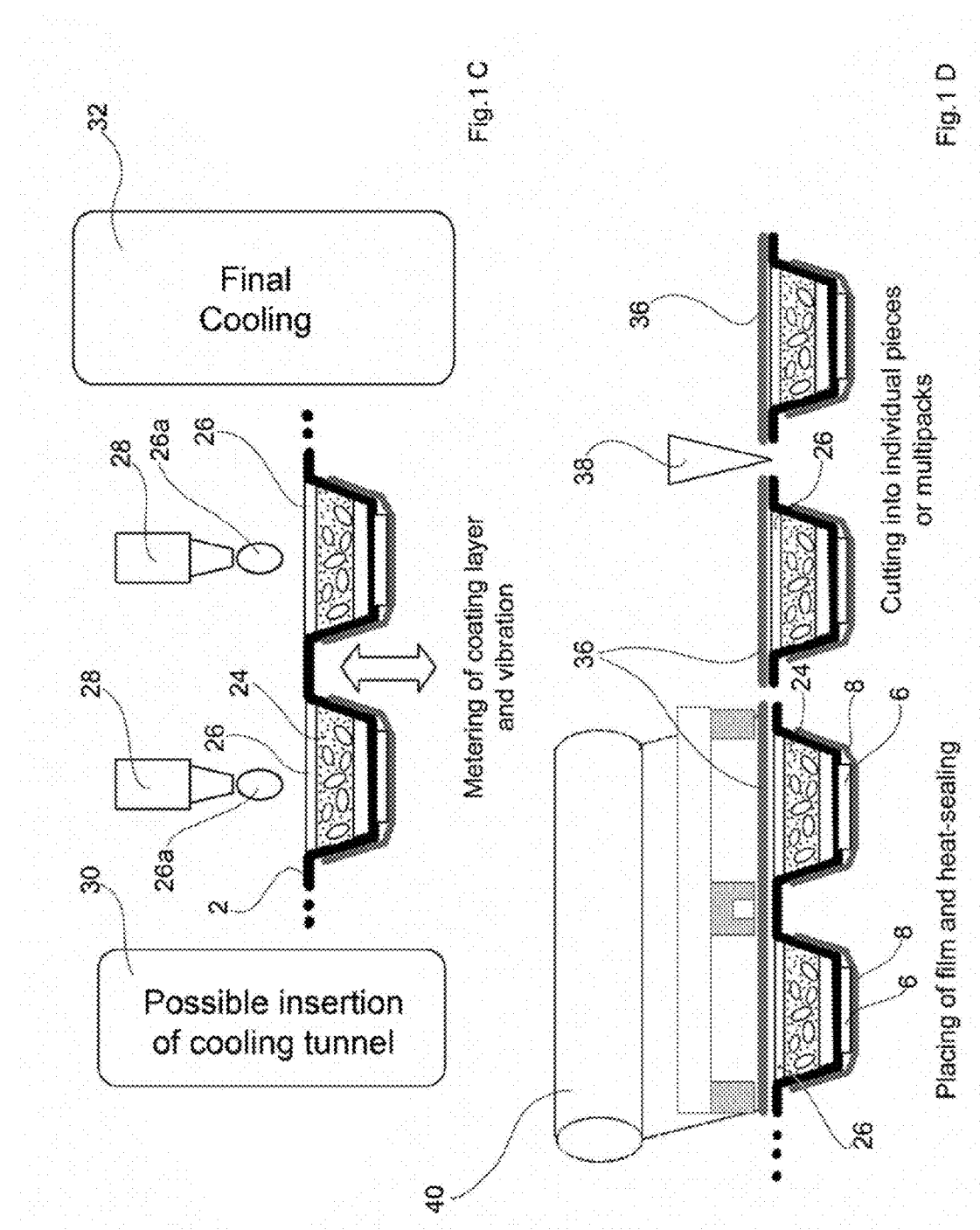

PACKAGED FOOD PRODUCT AND A PROCESS FOR ITS PRODUCTION

CROSS REFERENCE TO RELATED APPLICATION(S)

Figure 2:
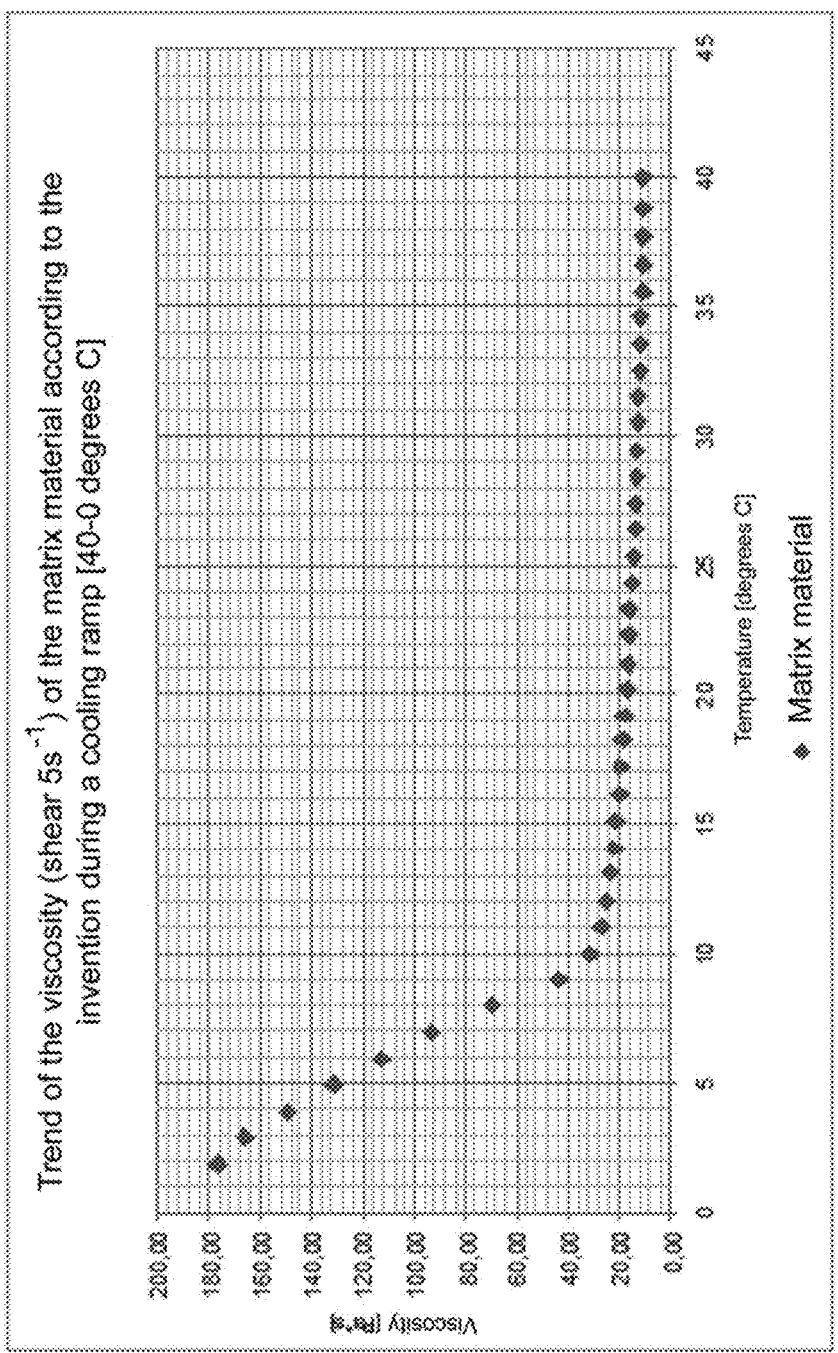

This application is a 35 U.S.C. §371 National Phase Entry Application from PCT/IB2010/055447, filed Nov. 26, 2010, designating the United States and claiming priority to Italian Application TO2009A000931 filed Nov. 27, 2009, the above identified applications are incorporated by reference herein in their entirety.

The present invention relates to a food product such as a snack having structural, organoleptic and nutritional characteristics similar or analogous to those of a bar or slab of chocolate including a filling, for example, of the type marketed by the company FERRERO S.p.A. under the mark KINDER CEREALI®.

The structure of the KINDER CEREALI® product comprises a flat shell made of chocolate or the like with a surface having raised squares which is typically produced by the conventional technique of pouring the chocolate into a mould, vibrating the mould, turning over, and draining; the above mentioned shell includes an edible filling in which puffed cereal grains are embedded; a coating layer, generally made of the same chocolate-based composition as the shell, is deposited on top of the filling to seal the shell.

The product is in the form of a bar in which the shell, the coating layer, and the filling layer have a solid consistency at room temperature so that, in order to eat the product, the consumer can break off one or more squares by hand or by biting. The product is wrapped in a flow-pack type wrapper made of sheet material.

Products of the above-mentioned type are highly rated by consumers because of their organoleptic and nutritional characteristics as well as the ease of handling which renders them ideal products for consumption as portable snacks.

Their main disadvantage, which is connected with use as a portable snack, however, lies in their high degree of heat sensitivity. At temperatures above 30° C.-35° C., the shell and also the filling are in fact liable to melt which not only causes smearing of the wrapper of sheet material but, by also giving rise to the diffusion and mixing of the ingredients between adjacent edible layers, modifies and detracts from the organoleptic characteristics of the product, rendering it difficult to eat; this situation is comparable to that of all chocolate snacks and bars.

The heat sensitivity of these products means that their marketing, particularly in hot countries, is somewhat limited or precluded in summer.

Underlying the present invention is the idea of providing a food product which has structural, organoleptic and nutritional characteristics substantially similar to those of the above-mentioned snacks in bar form but the properties of which can remain substantially unchanged over a wide temperature range and particularly up to at least 40° C.

In view of this idea, the subject of the invention is a packaged food product and a process for the preparation thereof having the features defined in the appended claims.

A subject of the invention is a packaged food product comprising a tray, typically made of thermoformed plastics material, containing an edible composition in bar form having a layered structure; the layered structure of the product comprises at least one layer of composite edible material which, in terms of volume and weight, constitutes the largest layer of the product; this layer of composite edible material comprises puffed cereal grains embedded in an edible matrix which, in the preferred embodiment, comprises as principal ingredients, sugars, milk proteins, butyric fat and vegetable oils.

The structure of the product also comprises at least one coating layer of edible material preferably including chocolate, deposited on the composite layer.

In the preferred embodiment, the layered structure of the product also comprises a base layer which is deposited in contact with the bottom wall of the tray and preferably has different flavour and aroma characteristics from those of the matrix material forming the composite layer so as to make a taste contribution, but with rheological properties similar or analogous to those of the matrix material.

In this preferred embodiment, the layer of composite material is thus arranged in an intermediate position between the base layer and the coating layer.

The tray is closed by means of a conventional sealing sheet welded to the flange edges of the tray.

The salient feature of the layered product according to the invention is that the edible matrix material of the composite layer has and maintains, in equilibrium, throughout the temperature range between 5° C. and 40° C., a state of pasty consistency such that the material is plastic and mouldable throughout that temperature range.

The matrix material preferably has and maintains a pasty and non-fluid consistency throughout the temperature range between 20° C. and 40° C., throughout the shelf life of the product.

In everyday language, the term "pasty" means soft and yielding to the touch. In technical physics terminology, "pasty consistency" means the state of consistency which non-crystalline solids (which should actually correctly be considered as highly viscous fluids) can adopt on heating, that is, an intermediate state of consistency between the stiffness that is characteristic of solids and the fluidity that is typical of liquids (see Dizionario d'Ingegneria, E. Perucca, UTET, 1972).

The above-mentioned definitions are applicable in this context; however, as an empirical rule applicable to the case in question, a so-called "spoonable" consistency, that is, a consistency such that the substance can easily be picked up with a small spoon, in particular a simple plastics spoon or spatula, should also be understood as a pasty consistency.

The term "fluid consistency", on the other hand, should be understood in relation to a consistency such that the substance has an indeterminate shape in equilibrium, that is, it adopts the shape of the container which holds it.

For the purposes of the empirical rule given above, non-fluid consistency means a consistency such that when the substance is picked up (for example, with a small spoon as indicated above) it maintains its characteristics of shape in unconfined conditions.

In particular, the matrix material has a solid (spoonable) consistency when subjected to refrigeration to temperatures below 6° C. and preferably down to 0° C.

In the preferred embodiment, the edible matrix material has a pasty consistency (P) the percentage variation of which, as an absolute value, between the value measured by penetrometry at 20° C. and the value measured at 40° C. relative to the value measured at 20° C. [$(P_{20}-P_{40})/P_{20}$], is no greater than 87.5%, preferably no more than 80% and even more preferably no more than 50%, upon the understanding that the above-mentioned measurements should be taken in equilibrium conditions.

It is also preferable that the consistency such that the ratio of the consistency values, determined by penetrometry measurement at 40° C. and 20° C., be no less than 1:8, preferably no less than 1:5, the maximum value in any case being no greater than 1:2.

Consistency can be measured by instruments such as a TA.XT Plus Texture Analyzer, for example by the process described below; although the absolute consistency value may of course vary in dependence on the instrumentation and on the method used for its measurement, the above-mentioned percentage consistency variation values are applicable irrespective of the instrumentation and of the measurement process.

Moreover, a preferred and distinctive characteristic of the matrix material used according to the invention is that it has viscoelastic properties with a viscosity which remains measurable by means of a rheometer throughout the temperature range between 0° C. and 40° C. or at least within the range from 10° C. to 40° C.

This behaviour has been determined with the use of an Anton Paar MCR 301 rheometer with a set of CC27 coaxial cylindrical probes in accordance with the procedure described below.

In particular, the percentage variation in viscosity between the value measured at 10° C. and the value measured at 40° C., relative to the initial value of 10° C. ($(\mu_{10}-\mu_{40})/\mu_{10}$), changes by no more than 85%, preferably no more than 70%; the same percentage variation from 20° C. to 40° C., relative to the initial value of 20° C., preferably changes by no more than 60% and most preferably no more than 50%.

The same consistency and viscosity requirements that are indicated above with reference to the edible matrix material of the composite layer preferably apply to the edible base layer, when one is used.

With regard to the coating layer, the above-mentioned consistency requirements are not essential, although they are preferred; the coating layer may in fact be formed as a very thin layer, for example, of the order of 0.2-1 mm so as in any case to be easily breakable and removable with a small spoon, at least throughout the temperature range between 20° C. and 40° C. and preferably throughout the range of from 0° C. to 40° C.

Further characteristics and advantages of the packaged product according to the invention and of the process for the preparation thereof will become clear from the following detailed description given with reference to the appended drawings, which are provided by way of non-limiting example and in which:

FIGS. 1A, 1B, 1C and 1D show schematically, in sequence, steps of an industrial process for the production of the packaged product; and FIG. 2 is a graph showing the trend of the curve of viscosity as a function of temperature for an edible composition usable for the matrix material of the composite layer.

FIG. 1A shows the industrial step of providing the trays in a preferred but non-essential embodiment. The trays 2 are produced by thermoforming of a sheet of plastics material suitable for contact with foods. Thermoformed sheets 4 having a plurality of tray-shaped impressions connected to one another along the flange edges are produced with their concave sides facing downwards and a small spoon 6 or flat spatula useful for picking up the food product upon consumption is associated with the base wall of each tray, on the outside; each small spoon or spatula 6 is connected to the base of the tray, for example, by means of an adhesive label 8 removed from a roll 10. FIG. 1B shows the metering steps for the production of the layered food product in an example of implementation with continuous production; the sheet of plastics material containing the trays 2, which come from the final stage of FIG. 1A, still connected to one another along the flange edges, is cut into modules and the modules are then turned over with the concave sides facing upwards and are placed on a conveyor.

In the process according to the invention, each layer of edible material (naturally excluding the puffed cereal layer) is produced by depositing in the tray a plurality of separate drops of the edible material, followed by a vibration step. The metering process and apparatus described in EP 1 615 003 and EP 1 647 194 may be used for this purpose; a plurality of drops of the edible substance are deposited, preferably simultaneously, into each tray 2 and the tray is subjected to vibration.

The vibration step, which is performed whilst the edible substance is in the fluid state, causes the drops to spread out, giving rise to a continuous layer of substantially homogeneous thickness; the vibration may be applied to the trays in a horizontal and/or in a vertical direction.

From this point of view, the process according to the invention differs from the conventional process for the production of layered products of chocolate and the like, in which the edible substance constituting the individual layers is generally metered into rigid moulds which are subsequently subjected to turning over, draining, vibration and tamping.

In view of the rheological characteristics of the edible substances used, metering in drops is particularly advantageous for the purposes of obtaining layers of homogeneous thickness.

Surprisingly, it has been found that metering in drops followed by vibration leads to the production of a layer having uniform and homogeneous organoleptic characteristics throughout the layer.

With reference to FIG. 1B, metering nozzles, indicated 12, are arranged for depositing in each tray a plurality of drops of a first edible substance 14a for the formation of a first, base layer 14 which, however, constitutes an optional layer.

After the metering and relative vibration has been performed, a solidifying step (not shown) may optionally be performed and may take place at room temperature or in a cooling tunnel; when the metered layer starts to solidify, a predetermined amount of cereal grains G is metered into the tray. For this purpose, puffed cereal grains selected from barley, rice, wheat, spelt, buck wheat or mixtures thereof are preferably used. The metering is performed by means of a volumetric metering device illustrated schematically and identified by reference numeral 16. The metering of the cereals is preferably followed by a vibration step.

The layer of cereal grains is then subjected to a gentle pressing action by means of pad pressing members 18. The pressing step is performed so as to bring about substantially horizontal positioning of the grains within the layer, without causing breakage thereof; a vibration step may follow to improve the homogeneity of the layer thus obtained.

During the next step, the edible substance 24a which constitutes the matrix material of the composite layer, generally indicated 24, is metered. The matrix material is also preferably metered in drops with the use of a dropping volumetric metering device 20 of the above-mentioned type.

The step of metering in drops is preferably followed by a vibration step in a horizontal and/or in a vertical direction to give rise to as homogeneous as possible a distribution of the matrix material incorporating the grains.

Optionally, a solidifying step 30 follows at room temperature or in a suitable refrigerated tunnel (FIG. 1 C).

The step of metering of the coating layer, indicated 26, is then performed. The material of the coating layer is also metered with a dropping metering device 28 which meters drops 26a, in accordance with the processes described above, and is followed by a vibration step. A final cooling step 32 at room temperature or in a refrigerated tunnel follows.

FIG. 1D shows the final packaging step in which the trays are closed hermetically by the heat-sealing of a sealing sheet 36, supplied from a roll 40, onto the flange edges of the trays.

A final punching or shearing step 38 follows to produce the individual trays and the final package.

The edible composition used as matrix substance in the composite layer, which has the rheological characteristics indicated above, is preferably a substantially anhydrous composition in any case having a water content no greater than 2% by weight, comprising:

edible vegetable oils, for example, selected from sunflower oil, groundnut oil, hazelnut oil, palm oil and mixtures thereof in an amount of from 20% to 40% by weight;

dehydrated whole milk in an amount of from 20% to 40% by weight;

sugars, in particular, sucrose, in an amount of from 25% to 45% by weight, preferably from 25% to 40% by weight, together with edible emulsifiers such as soya lecithin, for example, in an amount of from 0.1% to 0.5% by weight, and food flavourings.

Dehydrated milk is preferably used, in dependence on its fat content, in an amount such as to introduce into the composition a contribution of anhydrous cow's butter (butyric fat) corresponding to about 5-10% by weight.

It is intended that other sources of anhydrous cow's butter may used instead of or in combination with dehydrated milk, so as to obtain cow's butter concentrations of the order mentioned above.

Moreover, the ratio by weight between anhydrous cow's butter and vegetable oil is preferably between 1:3.5 and 1:4.5, preferably about 1:4.

The base layer, which is indicated by reference numeral 14 in the foregoing description of the appended drawings, is optional. It may be constituted by the same food composition constituting the matrix substance of the composite layer.

However, in the preferred embodiment, the base layer is formed by a composition comprising the same ingredients mentioned above for the composition of the matrix material of the composite layer with the addition of a further ingredient for contributing flavour, in particular cocoa powder; by way of example, a composition of the type indicated above may be used with the addition of an amount of from 4% to 8% by weight of cocoa powder, relative to 100 parts of the above-indicated composition.

The coating layer is preferably formed by a conventional milk chocolate composition (for example, containing: sucrose, whole milk, cocoa paste, emulsifiers, flavourings) with the addition of cocoa butter, for example, in an amount of from 3% to 8% by weight, relative to 100 parts of milk chocolate composition.

It is intended that the formulation of the food compositions constituting the layers of the product according to the invention may vary widely with respect to the formulations indicated above whilst conforming to the rheological properties which constitute the principle on which the invention is based. Checking of the consistency and of its variation with temperature may be performed by means of a penetration test with the use, for example, of TA.XT Plus Texture Analyzer apparatus.

Tests carried out within the scope of the present invention were performed with the use of the following procedure.

The above-mentioned Texture Analyzer was used with a cylindrical aluminium probe, with different contact surface areas (4 mm, 25 mm, 35 mm diameter) according to the temperature range at which the measurement was taken. The analytical process provided for the penetration of the probe for a distance of 1 cm into the composition of substance to be tested with a penetration rate of 1 mm/sec and reading of the maximum stress recorded during the travel as an index of structural compactness.

The samples subjected to the test were placed in sealed, screw-capped glass containers of about 200 ml volume and conditioned in accordance with the industrial standard (48 hours at 8° C. and 5 days at 18° C.). The samples were then placed in climatic cells at various temperatures (0° C., 10° C., 20° C., 30° C., 40° C.) and left to acclimatise for 8 hours. Each measurement was replicated eight times and the average of the values and the standard deviation were obtained.

The data output by the Texture Analyzer (kg) was divided as appropriate by the contact area so as to give a comparable value for all of the probes, expressed in $g/mm^2$.

The penetration stress values in $g/mm^2$ (mean values and standard deviation) are given by way of example in the following table in relation to a composition of matrix material of the composite layer the composition of which falls within the following ranges of ingredients:

| | |
|---|---|
| sucrose | 25-45% by weight |
| sunflower oil | 25-35% by weight |
| dehydrated whole milk (fat content 26%) | 25-35% by weight |
| soya lecithin | 0.1-0.5% by weight |
| flavourings | 0.01-0.04% by weight |
| cow's butter/sunflower oil weight ratio 1:4 | | compared with the penetration stress values of a conventional matrix of the composite layer used in the KINDER CEREALI® product.

| | Penetration stress ($g/mm^2$) ± sd | |
|---|---|---|
| Temperature ° C. | conventional matrix | matrix of the invention |
| 0 | 985.3 | 6.4 |
| | 20.1 | 0.4 |
| 10 | 389.5 | 0.54 |
| | 12.5 | 0.11 |
| 20 | 98.3 | 0.24 |
| | 3.2 | 0.04 |
| 30 | 1.02 | 0.05 |
| | 0.04 | 0.01 |
| 40 | 0.04 | 0.05 |
| | 0.01 | 0.01 |

Analysis of the tabulated penetration data shows clearly the difference in the behaviour of the two formulations.

The closer the temperature is to 0° C., the more pronounced the differences become. At 40° C. the penetration stress for the two formulations seems similar, but is significantly different ($p \leq 10^{-9}$).

With reference to the penetration stress parameter, formulations in which the consistency, determined with a TA.XT-Plus Texture Analyzer, has values between 0.05 and 0.5 $g/mm^2$ at a temperature of 20° C. and values between 0.02 and 0.2 $g/mm^2$ at a temperature of 40° C. are preferred within the scope of the invention.

FIG. 2 is a graph which illustrates the trend of the viscosity curve of a composition according to the invention as a function of temperature.

The viscosity was measured with a Anton Paar MCR 301 rheometer and the CC27 set of coaxial cylindrical probes. The procedure adopted consisted in the loading of the sample at 20° C. and subsequent heating for 15 minutes to 40° C. Once the temperature had stabilized, in order to calculate the viscosity, the instrument imposed a continuous shear rate of 5 s$^{-1}$ and a linear thermal ramp of −1° C./min.

Points were acquired every 30 seconds; each sample was analyzed in triplicate.

Setting: Mode CSR
Shear rate: 5 s$^{-1}$
Thermal ramp: −1° C./min.
Gap: set by the CC27 standard The viscosity of the composition according to the invention, measured by the procedure indicated above, preferably falls within one of more of the following ranges:

10° C.:44-25 Pa·s
20° C.:15-25 Pa·s
30° C.:10-15 Pa·s
40° C.:8-13 Pa·s the same ranges of values apply to the material of the edible base layer (when used).

The invention thus provides the consumer with a food product the rheological and structural properties of which remain almost unchanged over a wide temperature range and which can thus be eaten with the same methods of picking-up (by means of a spatula) at high temperatures (40° C.) as at relatively low temperatures, providing the consumer with a nutritional contribution which is similar to that of conventional chocolate bars or the like.

In particular, within the high temperature range of from 30° C. to 40° C., which is typical of the summer period in hot countries, the product maintains a pasty, "spoonable" and preferably non-fluid consistency and/or has a viscosity sufficiently high that, in equilibrium conditions at those temperatures, macroscopic diffusion (visually determinable) of the ingredients between adjacent layers is avoided.

Moreover, in the preferred embodiment, the product (even when taken out of a refrigerator, that is, in temperature conditions of the order of 2-8° C.) still has a pasty consistency which enables it to be picked up from the tray in which it is contained with a spatula or spoon, without the need to extract the product from the tray in order to break it into ingestible portions.

Naturally, the principle of the invention remaining the same, the details of implementation, particularly with regard to the edible ingredients used for each layer and the respective amounts may vary widely, without thereby departing from the scope of the appended claims.

The invention claimed is:

1. A packaged food product comprising a tray containing an edible composition having a layered structure, comprising:
   at least one composite layer comprising puffed cereal grains embedded in a matrix of edible material; and
   at least one edible coating layer deposited on said composite layer, characterised in that the matrix of edible material is formed by a substantially anhydrous composition having a water content no greater than 2% wt comprising vegetable oil, selected from the group consisting of sunflower oil, groundnut oil, hazelnut oil, palm oil and mixtures thereof, in an amount of from 20 to 40% by weight, dried milk in an amount of from 20 to 40% by weight, and sugars, in an amount of from 25 to 45% by weight, together with edible emulsifying agents and food flavourings, it has a pasty and spoonable consistency as determined by penetrometry throughout the overall temperature range of from 20 °C. to 40 °C.

2. A food product according to claim 1, characterised in that said edible matrix material has said pasty and non-fluid consistency throughout the temperature range of from 20° C. to 40° C., during the entire shelf-life of the product.

3. A food product according to claim 1, characterised in that said edible matrix material has a pasty consistency, the percentage variation of which, as an absolute value, between the value measured by penetrometry at an initial temperature of 20° C. and the value measured at 40° C. relative to the value measured at 20° C., is no greater than 87.5%.

4. A food product according to claim 1, characterised in that said edible matrix material has a consistency such that the ratio of the consistency values, determined by penetrometry measurements at 40° C. and 20° C., is no less than 1:8.

5. A food product according to claim 4, wherein the ratio of the consistency values is no less than 1:5.

6. A food product according to claim 1, characterised in that, throughout the temperature range of from 30° C. to 40° C., said edible matrix material has a viscosity such as to avoid macroscopic diffusion of the ingredients between adjacent layers, in equilibrium conditions.

7. A food product according to claim 1, characterised in that said edible matrix material has a water content no greater than 2% by weight and comprises vegetable oils, in an amount of from 25% to 35% by weight, sugars, in an amount of from 25% to 40% by weight, and butyric fat, in the amount from 5to 10% by weight, the balance to 100% by weight comprising milk proteins, edible emulsifying agents, and food flavourings.

8. A food product according to claim 7, characterised in that said matrix material has a weight ratio of butyric fat/vegetable oil of between 1:3.5 and 1:4.5.

9. A food product according to claim 1, characterised in that said edible matrix material has a consistency, determined by penetrometry with a TA.XTPlus Texture Analyzer, of between 0.05 and 0.5 g/mm$^2$ at a temperature of 20° C. and between 0.02 and 0.1 g/mm$^2$ at 40° C., respectively.

10. A food product according to claim 1, characterised in that it further comprises a base layer, which is deposited on the bottom wall of said tray, in a position underlying said composite layer, and which is different from said matrix material of the composite layer with respect to its organoleptic characteristics but has the same rheological properties as said matrix material.

11. A food product according to claim 10, characterised in that the material of said base layer is formed by a composition comprising from 20% to 40% by weight of vegetable oil, from 20% to 40% by weight of dried whole milk, from 25% to 45% by weight of sugars, and from 4% to 8% by weight of cocoa powder.

12. A food product according to claim 1, characterised in that said coating layer is formed by a milk chocolate composition supplemented with cocoa butter in an amount of from 3 to 8% by weight relative to 100 parts by weight of the milk chocolate composition.

13. A food product according to claim 1, characterised in that the edible matrix material has a viscosity the percentage variation of which between the value measured at 10° C. and the value measured at 40° C. relative to the value measured at 10° C., is no more than 85%.

14. A food product according to claim 1, characterised in that the edible matrix material has a viscosity measured with an Anton Paar MCR 301 (CC27) rheometer, of between 15 and 25 Pa.s at 20° C.

15. A process for preparing a packaged food product according to claim 1, characterised in that said composite layer is obtained by volumetric metering of a layer of puffed cereal grains into a tray-like container and metering of separate drops of the edible matrix material onto said layer of cereal grains, and by subjecting said tray to vibration whilst said edible matrix material is in the fluid state, in order to obtain a layer having an homogeneous thickness.

16. A process according to claim 15 characterised in that it comprises the steps of depositing separate drops of a first food material to form a base layer in said tray, subjecting the tray to vibration in order to obtain a layer with an homogeneous thickness, metering a layer of puffed cereals onto said base layer, subjecting said layer of puffed cereals to pressing so as to promote the horizontal arrangement of the grains without breakage, depositing drops of the matrix material onto said layer of cereals and subjecting the tray to vibration in order to obtain said composite layer, and depositing a further edible material in separate drops onto said composite layer and subjecting the tray to vibration in order to obtain a homogeneous coating layer.

17. A food product according to claim 1, wherein the at least one edible coating layer includes chocolate.

* * * * *